INVENTORS
Lawrence B. Knudsen
Aman D. Munjee

United States Patent Office 3,419,252
Patented Dec. 31, 1968

3,419,252
FLUID SCRUBBER
Lawrence B. Knudsen, Middletown, and Aman D. Munjee, South Orange, N.J., assignors to National Lead Company, New York, N.Y., a corporation of New Jersey
Filed June 15, 1965, Ser. No. 464,029
4 Claims. (Cl. 261—79)

ABSTRACT OF THE DISCLOSURE

Apparatus for contacting a fluid with a gas and more especially to a device for scrubbing gases wherein the gases pass upwardly through a scrubber comprising a tubular member having a ribbon-like helix secured to its inner wall and an axial support-member having a ribbon-like spiral secured to its outer wall, said spiral overlapping said helix and both the spiral and helix having a downward slope.

---

Heretofore industrial equipment for bringing liquids into intimate contact with gases or vapours have been characterized by towers or chambers filled with materials of the most varied kind and shape for distributing the liquid over the largest possible area for contact by the gases or vapors; or have embodied complex arrangements of disks, funnels and the like for cascading the fluid from upper to lower levels while passing the gas or vapor thereover.

While these types of scrubbers have been used with limited success those that employ filler materials are frequently plagued by channeling, surging, plugging and material disintegration, while the more complex mechanical designs are relatively expensive and require frequent repair.

An object therefore of the present invention is to provide an improved device for effecting intimate contact between a fluid and a gas which is of relatively inexpensive, simple construction and free from the disadvantages which attend the gas scrubbers heretofore known and used.

A further object of the invention is to provide an improved gas scrubbing device having no moving parts or filler materials and capable of operating successfully over extended periods of time without maintenance or repair.

These and other objects, features and advantages of the invention will be more explicitly brought out in the description which follows wherein.

Figure 2:
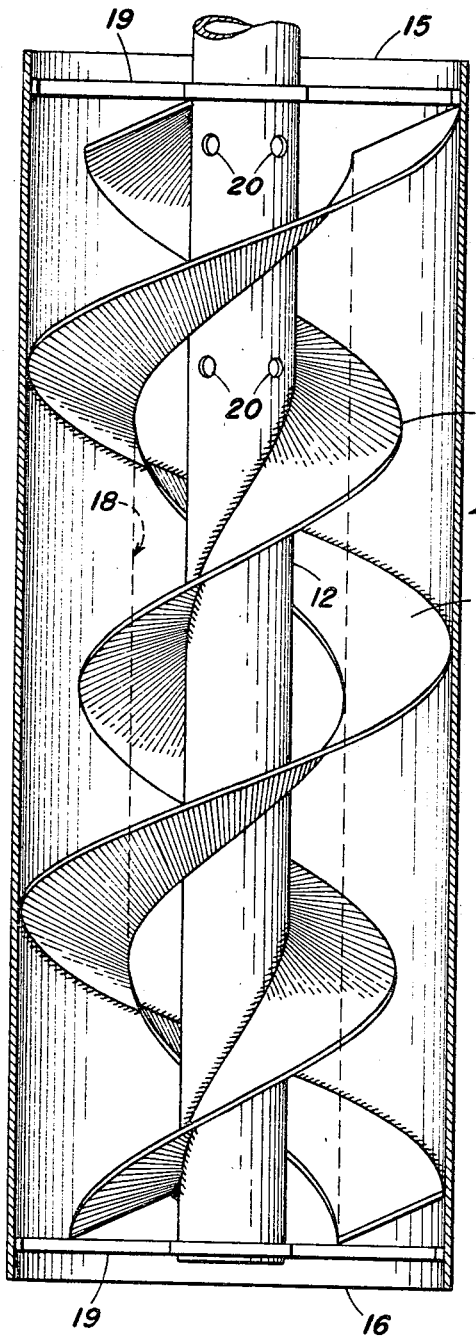
FIG. 2 is an enlarged vertical elevation, partly in section, of the gas scrubber shown in FIGURE 1.

Referring to the drawings the preferred structure, according to the present invention, comprises an integrated assembly consisting essentially of four principal elements namely, a housing 10, a helix 11, a support-member 12 and a spiral 13, all of the elements being fixedly secured in a unitary or integrated structure having no moving parts; and constructed of suitable materials for withstanding the corrosive effects of acids, alkalies and the like. A particularly suitable material for withstanding hot acids i.e. $H_2SO_4$ is lead but it will be understood that other metals, metal alloys and even some types of plastics or ceramics may be used.

In a preferred embodiment of the invention the housing 10 comprises a tubular member substantially circular in cross-section and of substantially uniform diameter throughout its length. However, it is within the purview of the invention, to use a tubular member having a cross section other than circular i.e. elliptical, rectangular, square, or the like. As seen by reference to FIG. 2 both the upper and lower ends of the housing 10 are open for the passage of a fluid therethrough. In the particular embodiment shown, fluid in the form of a liquid, or liquid slurry is fed from a supply source, shown schematically at 14, see FIG. 1, into the upper end 15 of the housing while a gas or vapor enters the bottom end of 16 of the housing from a source 17 and passes up through the housing countercurrent to the flow of liquid down therethrough.

Scrubbing the gas or vapor by means of the liquid is effected by means of a combination of helical and spiral surfaces, as represented by the helix 11 and the spiral 13, in FIGURE 2. The helix 11 comprises a continuous helical surface preferably made of lead or equally non-corrosive material, and is fixedly secured, as by welded or soldered joints, to the inner wall of the housing 10 in the manner shown. Further, as shown by reference to FIGURE 2, the helical surface is of substantially uniform width throughout its length, its width being such that the inner edge of the helical surface defines the perimeter of a central passage, indicated at 18, extending axially through the housing. In the embodiment of the invention shown in the drawings the width of the helical surface of the helix is approximately one quarter the diameter of the housing 10 as a consequence of which the diameter of the central passage 18 through the housing is substantially one half the diameter of the housing. It will be understood however, that these dimensions are not critical nor limiting to the scope of the invention as defined in the claims. A significant feature of the helix is the pitch of its helical surfaces. As seen by reference to FIGURE 2 the helical surfaces of the helix slope downwardly and inwardly from the wall of the housing at an angle of approximately 25° from the horizontal. It is essential to the success of the instant invention that the helical surfaces of the helix slope downwardly and inwardly in the direction of the central passage 18 for reasons explained hereinafter; however, the degree of slope or pitch is not critical, but is based primarily upon a consideration of the nature of the fluids. i.e. its consistency, fluidity, etc. as well as the rate of fluid flow, the countercurrent flow of the gas or vapors, and other factors. While a pitch of 25° has been found preferable for the uses illustrated herein it will be understood that this may vary and that a pitch within the range of 10° to 45° from the horizontal may be used.

Mounted in the central passage 18 of the housing 10 concentric with the helix is the support-member 12 which, in the embodiment shown, comprises a metal tube or post, fixedly secured to the housing in any acceptable manner as for example, by spiders or brackets 19—19 secured to the upper and lower extremities respectively of the support-member and to adjacent points on the wall of the housing.

As a tube, the support-member 12 may also serve as means for introducing a fliud into the scrubbing device for contact with its spiral and helical surfaces and to this end may be provided with radial apertures 20—20.

The support-member or post 12 serves to support the spiral 13 which, as shown, comprises a continuous spiral surface, preferably formed of lead, fixedly secured to the post 12 and extending throughout the length of the housing 10. As shown in FIGURE 2 the spiral surfaces are of substantially uniform width which is such that the outside diameter of the spiral is greater than the diameter of the central passage 18 i.e. the outside diameter of the spiral 13 is greater than the inside diameter of the helix 11 so that the spiral surfaces of the spiral overlie the helical surfaces of the helix. The extent to which the spiral overlies the helix is not critical but preferably the outside diameter of the spiral is such that the spiral surfaces overlie approximately half the width of the helical surfaces as shown in FIGURE 2. Moreover, the spiral surfaces are designed to slope downwardly and outwardly from the supporting post 12. The angle of slope or pitch from the horizontal is not critical but determined by such considerations as the fluidity and flow rates of the liquid or slurry being used. However as used for scrubbing gases in the manner hereinafter described the pitch of the spiral surfaces may be within the range of 10° to 45° from the horizontal and is preferably 25°.

From the foregoing description it will be clear that the gas scrubbing device of the invention is characterized by a housing having, in combination, a fixed helix and a fixed spiral, the latter being supported within the central passage defined by the helix; the spiral being concentric with the helix, and having its surfaces overlying the helical surfaces of the helix. Moreover, the pitch of the helical surfaces is inwardly and downwardly while the pitch of the spiral surfaces is outwardly and downwardly. Consequently a fluid introduced into the top of the housing is caused to cascade down, by gravity feed, over the respective surfaces of the helix and spiral, the fluid being thrown outwardly and downwardly by the pitch of the spiral surfaces and by centrifugal forces onto the helical surfaces which in turn cause the fluid to be thrown back onto the spiral surfaces. In this manner the fluid is dispersed over an exceptionally large area thus offering considerable fluid surface for contact by a gas or vapor.

Figure 1:
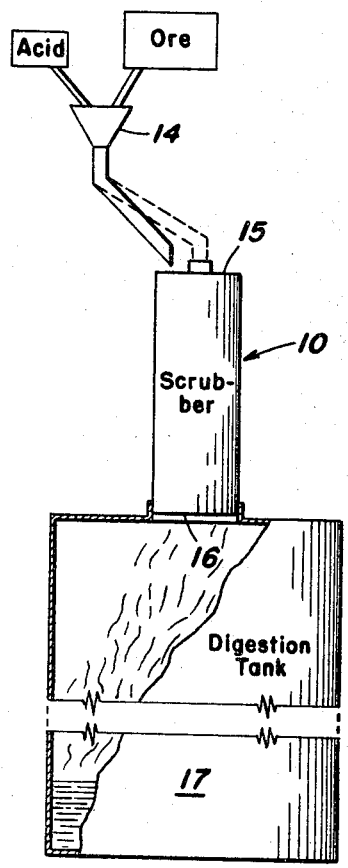
FIG. 1 is a schematic view of the gas scrubbing device of this invention as used for scrubbing gases produced in the digestion of an acid ore slurry.

As an illustration of the operation of the scrubbing device of this invention a unit was used, see FIG. 1, to feed a mixture of ore and acid i.e. an ore slurry to a digestion tank and scrub the fumes produced by reaction of the ore and acid.

The scrubbing device was constructed of lead and had the following dimensions:

Housing:
    ID (in.) _____ 1⅞
    Length (in.) _____ 10
Helix:
    Width (band, in.) _____ ½
    No. of turns _____ 5.5
    Length (in.) _____ 9
    Slope of helix (deg.) _____ 25
Center post O.D. _____ ¼
Spiral:
    Width (band, in.) _____ ½
    No. of turns _____ 5.5
    Length (in.) _____ 9
    Slope of spiral (deg.) _____ 25

A slurry, composed of a mixture of 40% milled ilmenite ore and 60% concentrated (95%) sulfuric acid was fed into the top of the scrubber at the rate of 0.2 gallon per minute. This slurry cascaded downwardly from spiral to helix and from helix to spiral, etc. while digestion reaction vapors rose upward or counter-currently from the digestion tank i.e. source 17, through the scrubber. Due to the disposition of the spiral and helix the slurry was dispersed over the surfaces of the helix and spiral in a thin film, as a consequence of which both the sensible heat and steam from digestion reaction vapors were readily absorbed by the thin film of slurry causing the slurry temperature to increase from 30° C. to as high as 220° C. in a matter of seconds.

It will be understood that the foregoing description is illustrative only and not limiting of the invention and that scrubbers of similar design but of greater or lesser dimensions are contemplated and indeed included within the scope of the invention as defined in the appended claims.

It is noteworthy that while a mixture of acid ore slurry at temperatures greater than 190° C. is normally extremely reactive and quickly converts to an immobile, unmanageable dry product, it has been found, quite unexpectedly, that no difficulties of this kind have been experienced using the device of this invention. Plug-ups, channeling and hang-ups are not experienced.

From the foregoing description and examples it is evident that the fluid scrubber of this invention is characterized by an integrated structure embodying the combination of a helix and spiral assembled within a housing in concentric relationship; that the structure is of relatively simple and sturdy construction, is capable of operating without malfunctioning over long periods of time, is relatively inexpensive and can handle acid-ore slurries at unusually high temperatures without plugging.

We claim:
1. Apparatus for contacting a fluid with a gas comprising in combination; a substantially vertical cylindrical housing, a ribbon-like helical surface on the inner wall thereof, said helical surface being constructed and arranged to form a central passage through said housing, a support-member constructed and arranged to be mounted within said central passage axially thereof, and a ribbon-like spiral surface fixedly secured to the outer wall of said support-member substantially concentric with said helical surface.

2. Apparatus for contacting a fluid with a gas according to claim 1 wherein the ribbon-like helical surface is constructed and arranged to slope downwardly, inwardly towards said central passage and said ribbon-like spiral surface is constructed and arranged to slope downwardly, outwardly from said central passage.

3. Apparatus for scrubbing gases with an aqueous slurry comprising in combination, a substantially vertical cylindrical housing, a continuous-ribbon-like helix fixedly secured to the inner wall of said housing, said helix being constructed and arranged to form a central passage through said housing, a support-member constructed and arranged to be mounted within said central passage axially thereof, and a continuous-ribbon-like spiral fixedly secured to the outer wall of said support-member substantially concentric with said helix, the outside diameter of said spiral being greater than the inside diameter of said helix but less than the inside diameter of said cylindrical housing.

4. Apparatus for scrubbing gases with an aqueous slurry according to claim 3 wherein the surfaces of said ribbon-like helix slope downwardly inwardly at an angle from the horizontal within the range of from 10° to 45° towards said central passage and the surfaces of said ribbon-like spiral slope downwardly outwardly from said central passage at an angle from the horizontal within the range of from 10° to 45°.

References Cited

UNITED STATES PATENTS

| | | | |
|---|---|---|---|
| 477,058 | 6/1892 | Luthman | 55—456 X |
| 793,110 | 6/1905 | Uehling | 261—79 |
| 940,652 | 11/1909 | Nye | 261—59 |
| 1,205,563 | 11/1916 | Pepper. | |
| 2,096,407 | 10/1937 | Reitmeyer | 261—79 X |
| 2,317,101 | 4/1943 | Lecky | 261—79 |
| 2,696,373 | 12/1954 | Dautrebande | 261—79 X |

FOREIGN PATENTS 1,108,666    6/1961    Germany.

HARRY B. THORNTON, *Primary Examiner.*

TIM R. MILES, *Assistant Examiner.*

U.S. Cl. X.R.

55—238